Aug. 16, 1966 G. J. BECKER 3,266,364
RELEASABLE FASTENER
Filed Oct. 22, 1962

INVENTOR
GEORGE J. BECKER
BY
Kemon, Palmer, Stuart & Estabrook
ATTORNEYS

United States Patent Office 3,266,364
Patented August 16, 1966

3,266,364
RELEASABLE FASTENER
George J. Becker, Sepulveda, Calif., assignor to Avdel, Inc., Burbank, Calif., a corporation of California
Filed Oct. 22, 1962, Ser. No. 232,198
8 Claims. (Cl. 85—77)

This invention relates to releasable fasteners, and more particularly, it concerns improvements in releasable fasteners of the type having an externally threaded, split-bolt member the shank segments of which are expandable to engage the internal threads on a socket or nut member, the fastener being qnickly releasable by contraction of the split-bolt segments.

An object of the present invention is to provide an improved releasable fastener of the type referred to which is compact and easily manipulated in use.

Another object of this invention is the provision of an improved releasable fastener of the type referred to in which a minimum of the operating components are exposed, thereby reducing to a minimum the chances for malfunctioning caused by dirt and the like.

A further object of this invention is to provide a highly effective and improved releasable fastener of the type including a contractible, externally threaded bolt component by which bolt segments forming the split-bolt member may be firmly held in an expanded condition in engagement with internal threads on a socket or nut member and yet which may be quickly and easily released by contraction of the split-bolt segments.

Still a further and significant object of the present invention is the provision of a releasable fastener of the type referred to which is effective for the intended use and which can be produced at a minimum of manufacturing costs.

Other objects and further scope of applicability of the present invention will become apparent from the detailed description given hereinafter. It should be understood, however, that the detailed description indicates a preferred form of the present invention and is given by way of illustration only.

In general, the aforementioned objects are accomplished by a releasable fastener provided with a handle portion in the form of a tubular shell having a central axial opening or chamber, a split-bolt formed of separate longitudinal segments each having an enlarged head portion positioned within the shell opening and an externally threaded shank portion extending out of the shell The enlarged head portions cooperate with shoulder means in the shell such that the externally threaded bolt segments may be constrained to a contracted position out of contact with internal nut or socket threads with which they are adapted to make threaded engagement. A plunger extends at one end within the shell opening and at the other end is provided with cam means for engaging cooperating ramp portions on each of the externally threaded bolt segments and is operative to effect outward movement of the segments into engagement with internal socket threads upon axial movement of the plunger. To effect such axial movement of the plunger, and also to assure movement of the segments to a retracted position upon movement of the plunger from a locked position, a compression spring is provided in the tubular shell opening operably connected between the one end of the plunger and the segment head portions. In this manner, the compression spring serves the two-fold purpose of moving the plunger axially upon manual release so that the externally threaded bolt segments are moved outwardly as aforesaid and, in addition, yieldably urging the bolt segments inwardly to a retracted position upon manual depression of the plunger against the bias of the spring In addition to the aforementioned operating components, the fastener is constructed so that torque may be transmitted from the handle to the bolt segments for threadably tightening the bolt portion within internally threaded sockets or the like without danger of relative rotation between the externally threaded split-bolt portion and the tubular shell.

The split-bolt segments are pivotally supported on the edge of an aperture formed in a separate cover plate which closes one end of the shell, the aperture being of noncircular form and serving to hold the segments against turning of the bolt with respect to the shell.

A more complete understanding of the present invention and its method of use may be had by reference to the accompanying drawings in which.

Figure 1:
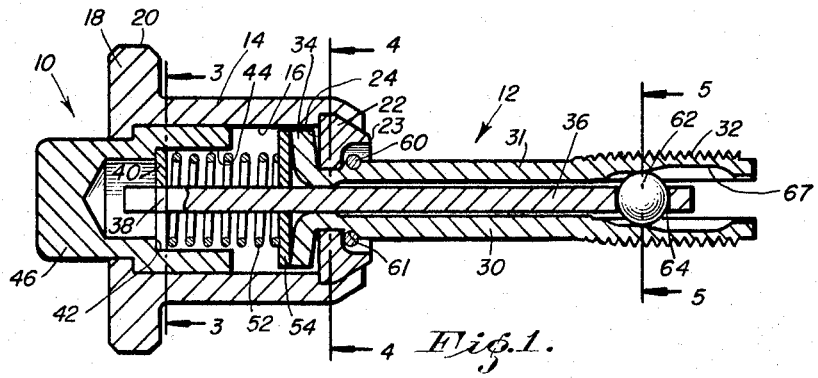
FIG. 1 is a longitudinal cross-section taken centrally through a releasable fastener embodying one form of the present invention and showing the position of the components thereof when the split-bolt segments are expanded to a position where they will engage internal threads in a socket (not shown)

Referring now to the drawings, the releasable fastener of this invention is shown as including a handle member and a split-bolt member generally designated by the reference numerals 10 and 12 respectively. The handle member takes the form of a tubular shell 14 having a central axial opening or chamber 16 provided at one end with a radially projecting annular flange 18 having on its circumferential edge 20, suitable means such as knurling or the like (not shown) by which the application or torque to the shell is facilitated. At the end of the shell 14 opposite from the flange 18, an apertured cover plate or piece 22, having an outwardly facing abutment surface 23 and a substantially flat inner surface 24 is non-rotatably fixed to the shell, after it has been completely formed as explained below. In the example shown, the apertured cover plate is fixed to the end of shell 14 by having at least a portion thereof inserted in the end of the shell by a tight press-fit. To enhance the non-rotatable fixing of the cover piece 22 within the shell 14, the periphery of the portion of the cover piece which enters the shell may be provided with serrations 26 shown on the lower half of plate 22 in FIG. 2. For accuracy in positioning the cover piece, it is preferred to insert the piece in an enlarged counterbore formed in the end of the shell, and the end portion of the shell may be crimped or rolled inwardly to embrace the peripheral portion of the cover piece, which may be of conical form as shown.

Figure 2:
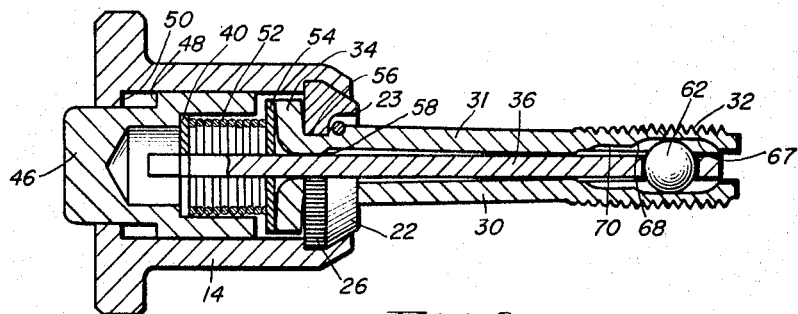
FIG. 2 is a longitudinal cross-section illustrating the form of the invention shown in FIG. 1 but with the threaded bolt segments contracted.

As shown in FIGS. 1 and 2, the cover plate 22 is recessed over its central area within the abutment surface 23, to reduce the thickness of the central portion of the plate. As most clearly shown in FIG. 4 of the drawings, the central portion of cover piece 22 is provided with a non-circular aperture 28. Preferably, though not necessarily, the aperture 28 is rectangular about three sides, the fourth side being arcuate as shown. The bolt member 12 extends through the aperture 28 and corresponds in cross-sectional configuration, at least in the region of the cover piece 22, to the non-circular shape of the cover piece aperture 28, see FIG. 4. In this manner, the bolt member 12 is restrained against rotational movement relative to the cover piece and the tubular shell 14.

The split-bolt member 12, in the form illustrated, includes two separate longitudinal segments 30 and 31, each provided with an externally threaded portion 32 at the projecting end or stem portion thereof and each having a head portion 34 positioned within the opening or chamber 16 in the shell 14. The head portions 34 are bent outwardly within shell 14 by an angle slightly less than 90° with respect to the bolt axis. Although two such longitudinal segments are preferred, it will be readily understood by those skilled in the art that within practical limits, a greater number of segments may be employed without departing from the spirit and scope of the invention. An actuating plunger 36, preferably of rectangular cross-section, projects axially between the segments 30 and 31 on one end and, at the other end, projects into the central space 16 of the shell 14. The end of the plunger 36 projecting within the shell 14 is provided with a pair of opposed recesses or notches 38 in opposite edges thereof for receiving a slotted disc 40 in a fixed axial position with respect to the plunger, the disc 40 in turn seating against an annular shoulder 42 provided by a central counterbore 44 in a plunger depressing button or knob 46. The button 46, as shown, is provided with an external ledge 48 which seats against an annular shoulder 50 provided in the axial opening 16 in the region of the flange 18 on the shell; the ledge and shoulder 48 and 50, respectively, cooperating to limit outward movement of the button 46. A compression spring 52 is disposed about the plunger 36 abutting at one end of the disc 40 and at the other end a centrally apertured disc or washer 54 slidably mounted on the plunger 36 and engaging the heads 34 of the split-bolt segments at the outer ends of the head portions. The length of the spring 52 in its relaxed state is selected so that when the button 46 is in its outermost position (FIG. 1), the spring is slightly compressed and, when button 46 is moved inwardly to the point of maximum axial compression, a substantial axial displacement of the plunger 36 is effected for purposes which will become apparent from the description which follows.

Figure 4:
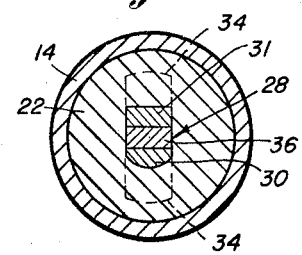
FIG. 4 is a cross-sectional view taken along line 4—4 of FIG. 1.

Referring again to FIGS. 1, 2 and 4 of the drawings, it will be noted that the bolt segments 30 and 31 are each provided with grooved portions 56 in engagement with complementary edges of the aperture 28 in the cover piece 22. This provides a transverse pivotal axis for each segment in the plane of apertured plate 22. Opposite the grooves 56, the segments are provided with inwardly projecting portions 58 engageable with opposite faces of the plunger 36, the assembly being such as to constrain the segments outwardly against the edges of the aperture 28 and thereby provide an assembly as shown in FIG. 4, corresponding to the cross section of the aperture by which relative rotation between the bolt segments and the cover piece 22 is restricted. Also, the head portions 34 on each of the segments is positioned at a slight angle with respect to the inner face 24 on the cover piece. This configuration of the head portions 34 together with the engagement therewith of the washer 54 under the influence of the compression spring 52, effects a yieldable pressing of the outer extremities of the head portions 34 in the direction of the seating shoulder afforded by the inner surface 24 of the cover piece 22. Correspondingly, the resulting rocking action of the segments about their pivotal axes operates to yieldably constrain the bolt segments 30 and 31 to the contracted position illustrated in FIG. 2 of the drawings. If desired, the resilient bias constraining the segments in a contracted position may be supplemented by a split ring or spring 60 engaging a groove 61 positioned axially outwardly of the inward projecting portions 58 on the respective segments but within the axial extent of the abutment surface 23 on the cover piece 22.

Figure 6:
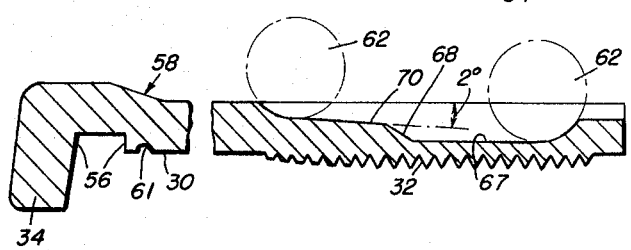
FIG. 6 is an enlarged fragmentary cross-sectional view illustrating a preferred ramp configuration by which the segments are cammed outwardly to an expanded position.

Cooperating cam means are provided on the projecting ends of the plunger 36 and segments 30 and 31 by which the threaded portions 32 of the segments may be moved outwardly into engagement with internal threads in a nut or socket (not shown) upon axial movement of the plunger under the influence of the compression spring 52. In the form illustrated, one element of such cam means takes the form of a spherical ball 62 retained in an aperture 64 formed transversely through the plunger 36, the diameter of the ball being larger than the thickness of the plunger to provide radial or transverse projections on opposite sides of the plunger. It is preferred that ball 62 be retained loosely in aperture 64 to permit turning of the ball, as by staking or peening of the aperture wall edge portions at spaced points about the aperture and on both faces of the plunger. As shown most clearly in FIG. 6, the cooperating cam element on each of the segments takes the form of a groove track for ball 62 formed on the inner face of the segment and generally designated by the reference number 66. Each groove extends throughout the length of travel of ball 62 and is formed of a runout section 67 of constant depth at the outer end of the groove, and the remainder of the groove is formed as a ramp section of varying depth. The run-out groove section 67 may be of a depth equal to or greater than the distance of projection of the ball beyond the faces of the plunger 36, to permit the bolt segments to have direct contact with opposite faces of the plunger when cam projections are in the runout section of the groove. Preferably, the ramp section is formed of a steeply inclined portion 68 and a relatively flatly inclined portion 70. Specifically, it has been found in practice that a desirable angle of inclinaion $a$ for the ramp portion 68 with respect to the axial centerline of the bolt member is approximately 18° while the angle $b$ made by the ramp portion 70 with respect to the axial centerline approximates 2°.

The releasable fastener of the present invention may be used in the usual manner to secure a member or members between the abutment face 23 and an internally threaded nut or socket receivable over the threaded portions 32 of the bolt segments 30 and 31. By depressing the button 46 to move the plunger and ball 62 thereon into the run-out groove section 67, the threaded portions of the segments are retracted inwardly a sufficient amount to completely clear the internal threads on a nut member or socket to be engaged. Also, simultaneously with such depression of the button 46, the compression of the spring 52 is increased, and the outer extremities of the heads 34 of the segments are more strongly urged toward the inner flat surface 24 on the cover piece 22, thus causing the segments to remain in engagement with the ball 62. After the segments of bolt portion 12 have been passed through aligned holes in two members to be clamped together, and the threaded portions 32 are located within the nut on the opposite side of the members, the plunger is released and permitted to move in the direction of the shell 14 under the influence of the spring 52. Upon such movement, the ball 62, upon reaching the inner end of groove section 67, rides up the steeply inclined ramp section 68 to effect immediate and relatively rapid outward movement of the threaded portions 32 of the bolt segments to engage the internal threads of the nut. Thereafter, upon continued axial movement of the plunger and ball 62, the ball engages the slightly inclined ramp section 70 to lock the threads 32 firmly against the internal socket threads. The user now grasps the flange 18 and rotates the bolt in the nut in a direction to draw the nut toward the abutment 23 and thereby clamp the two members together. Because of the slight inclination of the ramp section 70, the plunger is retained in position by the spring 52 without danger of axial movement brought about by the inward pressure on the threads 32, such as might develop upon subsequent tightening thereof by the application of torque to the handle member 10. The bolt member may be quickly released from an internally threaded socket by pushing the push-button 46 inwardly to move the ball 62 into the run-out groove sections 67, and the increased pressure of spring 52, acting on segment head portions 34, effects movement of the segments to a contracted position to disengage the threads of the bolt segment from the nut threads.

Figure 3:
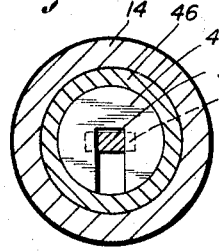
FIG. 3 is a cross-sectional view taken along line 3—3 of FIG. 1.
Figure 5:
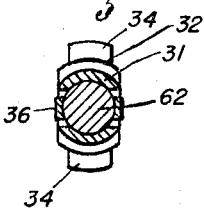
FIG. 5 is a cross-section taken along line 5—5 of FIG. 1.

As shown in the drawing, the bolt segments 30 and 31 are formed with flat inner faces which are parallel with but slightly spaced from the opposite flat faces of plunger 36 in their normal extended position as shown in FIG. 1. They are held in this position by ball 62 at one end and by enlarged sections 68 bearing directly upon the faces of plunger 36 within the shell 14. In the retracted position as shown in FIG. 2, the inner faces of the segments at the outer ends thereof may have direct contact with the opposing faces of plunger 36. As shown in FIGS. 3 to 5, the bolt segments preferably are of uniform width throughout their lengths, and the heads of the segments are of the same width as the stem portions, which is slightly smaller than the width of the aperture 28 in cover plate 22. The segments are inserted in the aperture from the rear face 24 of plate 22 before the plate is mounted on shell 14, and the plunger is inserted in the aperture between segments 30 and 31 from the front face of plate 22. All portions of plunger 36 which must pass through the aperture are of the same width as segments 30 and 31 but the front portion of the plunger carrying ball 62 may be somewhat wider. After assembly of the bolt segments and plunger on end plate 22, other parts are assembled on the plunger, such as washers 54 and 40 and spring 52, and after push-button 46 has been placed in shell 14, the end plate 22 is forced into the end of shell 14 and secured to the shell.

From the above description, it will be understood by those familiar in this art that by this invention there is provided a releasable fastener structure by which the above-mentioned objectives are fully realized. Since other forms of the invention than those described and illustrated herein are possible, it is to be distinctly understood that the foregoing description is illustrative only, not limiting, and that the true scope of the invention is to be determined by the appended claims.

I claim:

1. A releasable fastener for engaging within an internally threaded socket, comprising in combination: a handle member comprising a tubular shell having a central axial opening, a split-bolt member formed of at least two separate longitudinal segments having flat parallel inner faces, each segment having an enlarged head portion located in said opening, each segment of said split-bolt member having a stem portion projecting outside said tubular shell and provided at its projecting end with an externally threaded portion for engagement with the threads of the internally threaded socket, cooperating means on the shell and bolt member preventing relative rotation between the shell and the bolt segments, means providing a pivotal connection between said shell and each bolt segment to provide for movement of the threaded portion of the segment towards and away from the axis of said split-bolt member, spring means normally acting on said segments in a direction to move the threaded portions thereof towards said axis, a plunger of flat strip-like form having sliding contact with the inner faces of and extending axially between the segments of said split-bolt member and being slidable along the axis of said bolt member, and cam means connecting each segment with said plunger to effect outward movement of the threaded portions of said segments upon axial movement of the plunger in one direction to spread the threaded portions of the segments into threaded engagement with the socket, said cam means comprising, for each bolt segment, a single part having oppositely extending projections mounted within an aperture formed transversely through said flat plunger extending from said plunger on a transverse axis, said projections having contact with the inner faces of said bolt segments, said projections being formed symmetrically about said transverse axis, and each bolt segment having a longitudinal groove formed on the inner face thereof providing a guiding track for the end of said projections, said grooves being formed of a varying depth along the length of said segments to effect outward movement of said segments on axial movement of said plunger in said one direction.

2. A releasable fastener according to claim 1 wherein said single part forming said two projections comprises a spherical ball mounted for free turning within said aperture.

3. A releasable fastener for engaging within an internally threaded socket, comprising in combination: a handle member comprising a tubular shell having a central axial opening, a split-bolt member formed of at least two separate longitudinal segments each having an enlarged head portion located in said opening, each segment of said split-bolt member having a stem portion projecting outside said tubular shell and provided at its projecting end with an externally threaded portion for engagement with the threads of the internally threaded socket, co-operating means on the shell and bolt member preventing relative rotation between the shell and the bolt segments, means providing a pivotal connection between said shell and each bolt segment to provide for movement of the threaded portion of the segment towards and away from the axis of said split-bolt member, spring means normally acting on said segments in a direction to move the threaded portions thereof towards said axis, a plunger extending axially between the segments of said split-bolt member and being slidable along the axis of said bolt member, and cam means connecting each segment with said plunger to effect outward movement of the threaded portions of said segments upon axial movement of the plunger in one direction to spread the threaded portions of the segments into threaded engagement with the socket, said cam means comprising, for each bolt segment, a projection extending from said plunger on a transverse axis and having contact with the inner face of one bolt segment, said projection being formed symmetrically about said transverse axis, and each bolt segment having a longitudinal groove formed on the inner face thereof providing a guiding track for the end of the projection, said grooves in the inner faces of each bolt segment comprising an outer end section of uniform depth greater than the depth of the remaining portion of the groove, an intermediate section of decreasing depth, and an inner end section decreasing in depth at a slower rate than the intermediate section, to effect outward movement of said segments on axial movement of said plunger in said one direction.

4. A fastener according to claim 3 wherein said enlarged head portions extend outwardly from the axis of said bolt and are inclined at a small angle to the inner face of said shoulder means, and including means for yieldably pressing said head portions against the inner face of said shoulder means and thereby bias said segments towards retracted position.

5. In a releasable fastener having a handle member, a split-bolt member in the form of at least two longitudinal externally threaded segments projecting from the handle member and axially movable plunger means for moving the segments between radially expanded and contracted positions, said handle member comprising: a tubular shell having a central axial opening, an end cover piece non-rotatably fixed to one end of said shell and having a non-circular central aperture through which the longitudinal segments extend for preventing rotation of said segments with respect to said handle, an annular flange projecting outward radially at the other end of said shell, said shell having a shoulder projecting into said central opening at said other end; a plunger depressing knob projecting axially from said other end and restricted against outward axial movement by said shoulder; abutment means operably connecting said knob with the plunger means; and compression spring means between said cover piece and said abutment means for biasing said abutment means against said knob and said knob against said shoulder.

6. A releasable fastener for engaging within an internally threaded socket comprising: a handle member in the form of a tubular shell having internally facing shoulder means at one end thereof; a split-bolt member projecting from said one end of said shell, said bolt member including at least two separate longitudinal segments, each having a head portion received within said shell and a projecting stem portion having an externally threaded end portion; an axially movable plunger having one end within said shell and the other end projecting between said segments; and cooperating cam means on said plunger and said segments operative upon movement of said plunger in one direction to move the externally threaded portions of said segments outwardly to an expanded position for engagement with internal socket threads, said cam means including transverse projections carried on the projecting end portion of said plunger, each projection extending along a transverse axis from said plunger and enagaging the inner face of a bolt segment, which face is formed with an inclined ramp terminating in a run-out groove, whereby axial positioning of said plunger locating said transverse projections in said run out grooves permits contraction of said segments to bring the threaded portions thereof out of engagement with the internal socket threads, and axial movement of said plunger to position said transverse projections on said ramps operates to move said segments outwardly.

7. A fastener according to claim 6 in which said ramp comprises a steeply inclined section and a relatively flatly inclined section, said steeply inclined section being positioned between said flatly inclined section and said run-out groove.

8. A fastener according to claim 6 in which said transverse projections are in the form of a spherical ball retained in an aperture formed transversely through said plunger, said ball having a diameter exceeding the thickness of said plunger.

References Cited by the Examiner

UNITED STATES PATENTS

| 2,515,807 | 7/1950 | Spooner. | |
| 2,570,618 | 10/1951 | Werner | 85—2 |
| 3,158,059 | 11/1964 | Myers | 85—77 |

FOREIGN PATENTS

| 1,292,095 | 3/1962 | France. |
| 712,337 | 10/1941 | Germany. |
| 502,374 | 3/1939 | Great Britain. |
| 320,064 | 4/1957 | Switzerland. |

CARL W. TOMLIN, *Primary Examiner.*

EDWARD C. ALLEN, *Examiner.*

M. PARSONS, JR., *Assistant Examiner.*